(12) United States Patent
Ohno

(10) Patent No.: US 10,492,619 B2
(45) Date of Patent: Dec. 3, 2019

(54) AIR MAT DEVICE AND INTERNAL PRESSURE CONTROL METHOD OF AIR CELL

(71) Applicant: PARAMOUNT BED CO., LTD., Tokyo (JP)

(72) Inventor: Kenta Ohno, Tokyo (JP)

(73) Assignee: PARAMOUNT BED CO., LTD., Tokyo (JP)

( * ) Notice: Subject to any disclaimer, the term of this patent is extended or adjusted under 35 U.S.C. 154(b) by 159 days.

(21) Appl. No.: 15/273,829

(22) Filed: Sep. 23, 2016

(65) Prior Publication Data

US 2017/0086598 A1  Mar. 30, 2017

(30) Foreign Application Priority Data

Sep. 30, 2015  (JP) ................................. 2015-192727

(51) Int. Cl.
| | |
|---|---|
| *A47C 27/00* | (2006.01) |
| *A47C 27/08* | (2006.01) |
| *G05B 15/02* | (2006.01) |
| *G05D 7/06* | (2006.01) |

(52) U.S. Cl.
CPC ............ *A47C 27/083* (2013.01); *G05B 15/02* (2013.01); *G05D 7/0676* (2013.01)

(58) Field of Classification Search
CPC ............................... A47C 27/083; A47C 27/10

USPC ......................................................... 700/282
See application file for complete search history.

(56) References Cited

U.S. PATENT DOCUMENTS

| | | | | |
|---|---|---|---|---|
| 4,944,060 A | * | 7/1990 | Peery ................. | A61G 7/05776 5/713 |
| 2004/0222611 A1 | * | 11/2004 | Fenwick ................ | A61G 5/006 280/250.1 |
| 2014/0283308 A1 | * | 9/2014 | Chen ...................... | A61G 7/018 5/699 |

FOREIGN PATENT DOCUMENTS

| | | |
|---|---|---|
| EP | 2068133 | 6/2009 |
| JP | 4080522 | 7/1992 |
| JP | 05068629 | 3/1993 |
| JP | 2013116189 | 6/2013 |
| JP | 2014209958 | 11/2014 |

* cited by examiner

*Primary Examiner* — Hien D Khuu
(74) *Attorney, Agent, or Firm* — Meunier Carlin & Curfman LLC

(57) ABSTRACT

There is provided an air mat device comprising a mat unit that has an air cell; an air supply and exhaust unit that supplies air to the air cell and exhausts the air from the air cell; and a control unit that acquires a state change quantity of the air cell or a time required for a state change of the air cell, as a control reference value, and that controls the air supply and exhaust unit in accordance with the control reference value. There is also provided an internal pressure control method of an air cell according to the above configuration.

10 Claims, 7 Drawing Sheets

AIR MAT DEVICE AND INTERNAL PRESSURE CONTROL METHOD OF AIR CELL

CROSS-REFERENCE TO RELATED APPLICATIONS

This application claims priority to and benefit of Japanese Patent Application No. 2015-192727, filed on Sep. 30, 2015, the content of which is incorporated herein by reference.

BACKGROUND OF THE INVENTION

Field of the Invention

Embodiments of the present invention relate to an air mat device and an internal pressure control method of an air cell.

Background Art

In the related art, an air mat device is known which has a configuration disclosed in Japanese Unexamined Patent Application, First Publication No. 2014-209958. The air mat device includes a mat unit that has an air cell and an air supply and exhaust unit that supplies air to the air cell and exhausts the air from the air cell.

According to this type of air mat devices, it is generally preferable that internal pressure of the air cell in a usage state where an air supply and exhaust unit stops air supply and air exhaust and where a user lays a body weight of the user on a mat unit is set in accordance with the body weight of the user.

SUMMARY OF THE INVENTION

In recent years, since an air mat device has been more widely used, various control methods of internal pressure of an air cell have been required in the air mat device.

Embodiments of the present invention are made in view of the above-described circumstances, and an object thereof is to provide an air mat device and an internal pressure control method of an air cell, which can control internal pressure of the air cell in various ways.

In order to solve the above-described problem, embodiments of the present invention include the following:

(1) According to one aspect, there is provided an air mat device comprising a mat unit that includes an air cell; an air supply and exhaust unit that supplies air to the air cell and exhausts the air from the air cell; and a control unit that acquires a time required for changing the air cell from a first state to a second state, as a control reference value, and that controls the air supply and exhaust unit in accordance with the control reference value.

(2) According to another aspect, there is provided an air mat device comprising a mat unit that includes an air cell; an air supply and exhaust unit that supplies air to the air cell and exhausts the air from the air cell; and a control unit that acquires a state change quantity of the air cell as a control reference value while changing a state of the air cell in a state where a user applies a load to the air cell by at least partially laying a body weight of the user on the air cell, and that controls the air supply and exhaust unit in accordance with the control reference value.

(3) According to a further aspect, there is provided an air mat device comprising a mat unit that includes an air cell; an air supply and exhaust unit that supplies air to the air cell and exhausts the air from the air cell; and a control unit that acquires a state change quantity per unit time with regard to the air cell as a control reference value, and that controls the air supply and exhaust unit in accordance with the control reference value.

In these aspects, the time required for changing the air cell from the first state to the second state, or the state change quantity of the air cell, which serves as the control reference value, varies in accordance with a load applied to the air cell. Accordingly, it is possible to estimate the body weight of the user on the air cell by acquiring the control reference value. Therefore, when the internal pressure of the air cell is set in a usage state where the air supply and exhaust unit stops air supply and air exhaust and the user lays the body weight of the user on the mat unit, the air supply and exhaust unit is controlled in accordance with the control reference value. In this manner, the internal pressure of the air cell in the usage state can be set in accordance with the body weight of the user.

Here, in a case where the control unit estimates the body weight of the user by acquiring the control reference value while changing the state of the air cell in a state where the user applies a load to the air cell by at least partially laying the body weight of the user on the air cell, the control unit can estimate the body weight of the user while maintaining a state where the user lays the body weight on the mat unit. Therefore, for example, compared to a case where the user lying or sitting on the mat unit temporarily leaves away from the mat unit in order to estimate the body weight of the user and the user lies or sits again on the mat unit, it is possible to reduce burden on the user. Moreover, for example, in a case where the user needs care or nursing, it is also possible to reduce burden on a caregiver or a nursing attendant.

Furthermore, in a case where the body weight of the user is estimated while a state where the user lays the body weight on the mat unit is maintained, for example, even if the user needs the care or the nursing and the user has to stay in a state of lying or sitting on the mat unit for a long period of time, it is possible to suitably adjust the internal pressure of the air cell in accordance with the body weight whenever necessary.

In addition, in a case where the control unit acquires the time required for changing the air cell from the first state to the second state or the state change quantity of the air cell per unit time as the control reference value, the body weight of the user can be estimated in an intermediate stage until the state of the air cell is completely changed after the state of the air cell starts to be changed. Therefore, for example, it is possible to shorten a time required for estimating the body weight of the user.

(4) In the air mat device according to any one of the above-described aspects (1) to (3), the following configuration may be adopted. The air mat device further comprises a detection unit for detecting a state of the air cell. As the state of the air cell, the detection unit detects at least one of internal pressure of the air cell, a range of the load-applied air cell, a position of the air cell which relates to at least one of a shape and an inclined angle of the mat unit, a height of an upper surface of the air cell, a magnitude of the load applied to the air cell, and an air supply and exhaust quantity to and from the air cell. The control unit acquires the control reference value, according to a detection result of the detection unit.

In this case, the control unit acquires the control reference value, according to the detection result of the detection unit. Accordingly, it is possible to reliably estimate the body weight of the user on the air cell.

(5) In the air mat device according to the above-described aspect (1), the following configuration may be adopted. The air mat device further comprises a detection unit for detecting internal pressure of the air cell as a state of the air cell. The detection unit detects that the internal pressure of the air cell is first internal pressure, as the first state, and detects that the internal pressure of the air cell is second internal pressure, as the second state. In a state where a user lays a body weight of the user on the mat unit, while the control unit decompresses or pressurizes the air cell by causing the air supply and exhaust unit to exhaust the air or to supply the air, the control unit acquires a pressure changing time until the internal pressure of the air cell is changed from the first internal pressure to the second internal pressure, as the control reference value, according to a detection result of the detection unit.

(6) In the air mat device according to any one of the above-described aspects (1) to (5), the following configuration may be adopted. A plurality of air cells is provided, and the multiple air cells are divided into multiple groups. When acquiring the control reference value, the control unit causes the air supply and exhaust unit to supply the air or to exhaust the air. When the air is exhausted from each of the air cells, the control unit causes other groups to exhaust the air while remaining at least one of the multiple groups, and thereafter, supplies the air to the groups which exhausted the air.

(7) In the air mat device according to the above-described aspect (2), the following configuration may be adopted. The air mat device further comprises a detection unit for detecting internal pressure of the air cell as a state of the air cell. A plurality of air cells is provided, and the multiple air cells are divided into multiple groups. When the air is exhausted from each of the air cells, the control unit causes other groups to exhaust the air while remaining at least one of the multiple groups, and thereafter, supplies the air to the groups which exhausted the air. In a state where the user lays the body weight of the user on the mat unit, as the control reference value, the control unit acquires an internal pressure change in each of the air cells of a maintenance group which does not perform the air supply and exhaust, until the internal pressure in each of the air cells of an operation group which performs the air supply and exhaust is changed from first internal pressure to second internal pressure which is different from the first internal pressure, according to a detection result of the detection unit.

In these aspects, the control unit acquires the pressure changing time or the internal pressure change as the control reference value, according to the detection result of the detection unit. When this type of control reference value is obtained, the air supply and exhaust unit and an internal pressure measurement unit (detection unit) which are used for a generally-available air mat device can be utilized without any change. Therefore, it is not necessary to newly provide a dedicated sensor in order to estimate the body weight of the user. Accordingly, it is possible to restrain an increase in cost.

In addition, the pressure changing time or the internal pressure change can be measured concurrently when the generally-available air mat device normally performs the air supply and exhaust for the air cell, for example, when the generally-available air mat device performs the air supply and exhaust for the air cell in order to intentionally change a posture of the user. In this case, it is possible to minimize a human operation or a machinery operation that is needed to estimate the body weight of the user.

In addition, in order to obtain the body weight of the user, the air mat device measures the internal pressure change of the air cell instead of directly measuring the body weight of the user. Therefore, if the user lays the body weight on the mat unit within a fixed range in which the internal pressure of the air cell is changed to the same extent, the body weight of the user can be accurately estimated without depending on a position of the user on the mat unit.

Furthermore, the air mat device estimates the body weight of the user by measuring the internal pressure when the air is supplied to and exhausted from the air cell. Therefore, it is possible to restrain a load from being continuously applied to the internal pressure measurement unit which measures the internal pressure of the air cell over a long period of time. Accordingly, a state where the internal pressure measurement unit remains calibrated can be easily maintained.

According to the above-described configurations, the body weight of the user can be accurately reflected on the internal pressure of the air cell.

According to the above-described respective air mat devices, when the control unit acquires the control reference value, the control unit causes the air supply and exhaust unit to supply and exhaust the air. When the air is exhausted from the air cell, while at least one of the multiple groups remains, other groups exhaust the air. Thereafter, in a case where the air is supplied to the group which previously exhausts the air, the control reference value can be acquired in response to alternate expansion and contraction for preventing decubitus ulcers (bedsores). In this case, it is possible to restrain a comfortable feeling of the user on the bed from being affected, and it becomes possible to minimize a special operation or work of the user. Therefore, improved usability can be achieved.

In addition, as described above, in a case where the control unit exhausts the air from the air cell while remaining at least a part of the groups, the user can be supported by the air cell of the group which does not exhaust the air. Therefore, it is possible to restrain the user from sinking into the mat unit.

(8) In the air mat device according to the above-described aspect (6) or (7), when the air is supplied to and exhausted from each of the air cells, the control unit may change a combination between an operation group which performs the air supply and exhaust and a maintenance group which does not perform the air supply and exhaust so as to obtain the control reference value multiple times, and may control the air supply and exhaust unit in accordance with the control reference values obtained multiple times.

In this case, the control unit controls the air supply and exhaust unit in accordance with the control reference values obtained multiple times. Accordingly, for example, it is possible to reduce errors caused by disturbance, and the body weight of the user can be accurately estimated. Moreover, it is possible to set the internal pressure of the air cell.

(9) According to an aspect of an embodiment of the present invention, there is provided an internal pressure control method of an air cell which sets an internal pressure of the air cell in a usage state where an air supply and exhaust is stopped and a body weight of a user is supported by the air cell which performs air supply and exhaust. The method comprises a process of acquiring a time required for changing the air cell from a first state to a second state, as a control reference value; and a process of setting the internal pressure of the air cell in the usage state in accordance with the control reference value.

(10) According to another aspect of an embodiment of the present invention, there is provided an internal pressure control method of an air cell which sets an internal pressure of the air cell in a usage state where an air supply and exhaust is stopped and a body weight of a user is supported by the air cell which performs air supply and exhaust. The method comprises a process of acquiring a state change quantity of the air cell as a control reference value while changing a state of the air cell in a state where a user applies a load to the air cell by at least partially laying the body weight of the user on the air cell; and a process of setting the internal pressure of the air cell in the usage state in accordance with the control reference value.

(11) According to yet another aspect of an embodiment of the present invention, there is provided an internal pressure control method of an air cell which sets an internal pressure of the air cell in a usage state where an air supply and exhaust is stopped and a body weight of a user is supported by the air cell which performs air supply and exhaust. The method comprises a process of acquiring a state change quantity per unit time with regard to the air cell as a control reference value; and a process of setting the internal pressure of the air cell in the usage state in accordance with the control reference value.

(12) In the internal pressure control method of an air cell according to any one of the above-described aspects (9) to (11), the following configuration may be adopted. The internal pressure control method further comprises a process of detecting at least one of the internal pressure of the air cell, a range of the load-applied air cell, a position of the air cell which relates to at least one of a shape and an inclined angle of the mat unit in which at least a portion is formed from the air cell, a height of an upper surface of the air cell, a magnitude of the load applied to the air cell, and an air supply and exhaust quantity to and from the air cell, as a state of the air cell. In the acquiring process, the control reference value is acquired according to a detection result in the detecting process.

(13) In the internal pressure control method of an air cell according to the above-described aspect (9), the following configuration may be adopted. The internal pressure control method further comprises a process of detecting the internal pressure of the air cell as a state of the air cell. In the detecting process, as the first state, it is detected that the internal pressure of the air cell is first internal pressure, and as the second state, it is detected that the internal pressure of the air cell is second internal pressure. In the acquiring process, in a state where a user lays a body weight of the user on the air cell, while the air cell is decompressed or pressurized, a pressure changing time until the internal pressure of the air cell is changed from the first internal pressure to the second internal pressure is acquired as the control reference value, according to a detection result in the detecting process.

(14) In the internal pressure control method of an air cell according to any one of the above-described aspects (9) to (13), the following configuration may be adopted. In the acquiring process, the multiple air cells are divided into multiple groups, other groups are caused to exhaust the air while at least one of the multiple groups remains, and thereafter, the air is supplied to the groups which exhausted the air.

(15) In the internal pressure control method of an air cell according to the above-described aspect (10), the following configuration may be adopted. The internal pressure control method further comprises a process of detecting the internal pressure of the air cell as a state of the air cell. In the acquiring process, in a state where the user lays the body weight on the multiple air cells, the air is supplied to and exhausted from the air cell of an operation group which is a part of the respective air cells, and an internal pressure change in the respective air cells of a maintenance group which is the remaining part of the respective air cells until the internal pressure of the respective air cells of the operation group is changed from the first internal pressure to the second internal pressure different from the first internal pressure is acquired as the control reference value, according to a detection result in the detecting process.

(16) In the internal pressure control method of an air cell according to the above-described aspect (10) or (11), the following configuration may be adopted. In the acquiring process, when the air is supplied to and exhausted from the respective air cells, a combination of an operation group which performs the air supply and exhaust and a maintenance group which does not perform the air supply and exhaust is changed so as to obtain the control reference value multiple times. In the setting process, the internal pressure is set in accordance with the control reference values obtained multiple times.

In these aspects, the time required for changing the air cell from the first state to the second state, or the state change quantity of the air cell, which serves as the control reference value, varies in accordance with a load applied to the air cell. Accordingly, it is possible to estimate the body weight of the user on the air cell by acquiring the control reference value. Therefore, the internal pressure can be set in accordance with the body weight of the user by setting the internal pressure of the air cell in the usage state, according to the control reference value.

According to the above-described respective aspects of embodiments of the present invention, an air mat device and an internal pressure control method of an air cell which can control internal pressure of the air cell in various ways is provided.

DETAILED DESCRIPTION OF THE INVENTION

First Embodiment

Hereinafter, an air mat device 10 according to a first embodiment of the present invention will be described with reference to the drawings.

Examples of the air mat device 10 include a bed device on which a user P lies or a cushion device on which the user P sits. The present embodiment employs the bed device as an example of the air mat device 10. Examples of the bed device include a bed device having a back-raising function which enables a back-raising or back-lowering operation, and a bed device having no back-raising function. This type of bed device includes bed devices which electrically perform the back-raising or back-lowering operation (so-called electric bed) or a bed device which is manually operated without using electric power.

Figure 1:
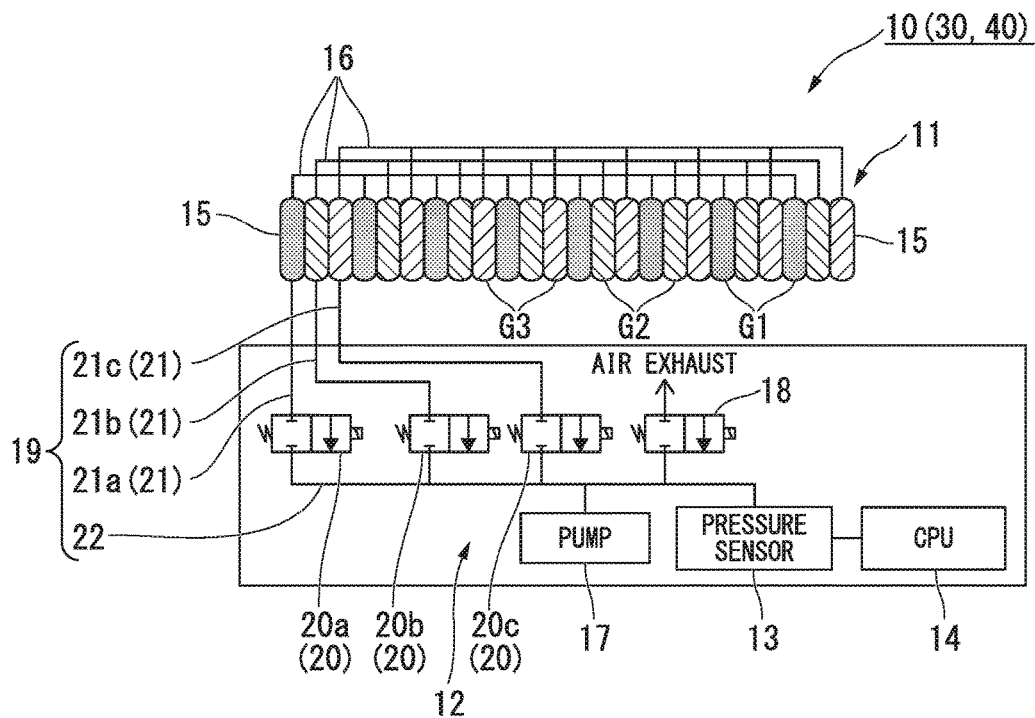
FIG. 1 is a view showing a schematic configuration of an air mat device according to a first embodiment, a second embodiment, and a third embodiment of the present invention.

As shown in FIG. 1, the air mat device 10 includes a mat unit 11 (mattress), an air supply and exhaust unit 12, an internal pressure measurement unit (detection unit, pressure sensor) 13, and a control unit (CPU) 14.

The mat unit 11 has multiple air cells 15. These air cells 15 are internally filled with air, thereby supporting a load of the user P lying on the mat unit 11. Internal pressure of the air cells 15 corresponds to hardness of the mat unit 11. The internal pressure of the air cells 15 is set in accordance with a body weight of the user P. In this manner, the hardness of the mat unit 11 can be adjusted to optimized hardness for the user P.

According to the mat unit 11 having the air cells 15 set to the optimized internal pressure in accordance with the body weight, body pressure of the user P is effectively dispersed, thereby enabling the body weight of the user P to be uniformly dispersed on the mat unit 11. For example, an arrangement can be made so as to prevent great pressure from being locally applied to the body of the user P or to prevent the user P from feeling discomfort such as foreign body sensation. This internal pressure of the air cells 15 is obtained as an empirical value through a test, for example. According to the air mat device in the related art in which the user P directly sets the hardness of the mat unit 11 without depending on the body weight of the user P, the user P may set unsuitable hardness, thereby causing a possibility that the body pressure may not be sufficiently dispersed.

A plurality of air cells 15 is provided. The air cell 15 is a rod-shaped cell extending in a width direction of the mat unit 11. In the shown example, the multiple air cells 15 are arranged in a longitudinal direction of the mat unit 11, thereby configuring the mat unit 11. For example, the air cell 15 can adopt a configuration in which the air cell 15 is formed in a bag shape through welding of vinyl chloride or urethane films. The air cells 15 arranged adjacent to each other may be fixed to each other, or may not be fixed to each other. The air cell 15 can be fixed, via a button or a string, to a cover (not shown) for entirely covering the multiple air cells 15.

The multiple air cells 15 are divided into multiple groups. For example, the multiple air cells 15 are divided into three groups G1 to G3 from a first group G1 to a third group G3. In the shown example, every two of the air cells 15 belonging to the same group are arranged in the longitudinal direction of the mat unit 11. That is, in a case of being viewed along the longitudinal direction of the mat unit 11, the respective air cells 15 are arrayed so as to repeat an arrangement sequence of the air cells 15 belonging to the first group G1, subsequent air cells 15 belonging to the second group G2, and further subsequent air cells 15 belonging to the third group G3.

The air cells 15 belonging to the same group internally communicate with each other via a communication route 16. In the air cells 15 belonging to the same group, mutual internal pressure varies by being synchronized. For example, the communication route 16 can preferably employ an air tube made of resins such as vinyl chloride.

The multiple air cells 15 are divided into the multiple groups G1 to G3 in this way. Accordingly, the air cells 15 of the respective groups G1 to G3 can alternately expand or contract (alternate expansion and contraction) at fixed intervals. In this manner, it is possible to change the selection of the air cells 15 for supporting the user P at fixed intervals. As a result, for example, repulsive force applied from the mat unit 11 is prevented from being loaded on the same body part of the user P for a long period of time. Accordingly, it is possible to restrain decubitus ulcers (bedsores) from occurring since the same pressure is loaded on a specific body part of the user for a long period of time. In addition, the air cells 15 of the respective groups G1 to G3 are caused to alternately expand or contract (alternate expansion and contraction), thereby enabling the user P to enjoy a massage effect.

The air supply and exhaust unit 12 supplies the air to the air cell 15, and exhausts the air from the air cell 15. The air supply and exhaust unit 12 includes a pump 17 for supplying the air to the air cell 15, an air exhaust valve 18 for exhausting the air from the air cell 15, a connection route 19 for individually connecting the air cell 15 to the pump 17 and the air exhaust valve 18, and multiple opening and closing valves 20 for opening and closing the connection route 19.

The connection route 19 includes multiple (three in the shown example) bifurcating routes 21 disposed corresponding to the groups G1 to G3 of the air cells 15, and a common route 22 to which the bifurcating routes 21 are connected in common. The respective bifurcating routes 21 are directly connected to one of the air cells 15, and are indirectly connected via the air cell 15 to the other air cell 15 of the groups G1 to G3 to which the air cell 15 belongs. The common route 22 individually connects the multiple bifurcating routes 21 to the pump 17 and the air exhaust valve 18.

The multiple openings and closing valves 20 are disposed (three in the shown example) corresponding to the bifurcating routes 21, and opens or closes the bifurcating routes 21 which themselves are disposed at.

Hereinafter, in the three bifurcating routes 21, the bifurcating route 21 corresponding to the first group G1 of the air cells 15 is referred to as a first bifurcating route 21a, the bifurcating route 21 corresponding to the second group G2 is referred to as a second bifurcating route 21b, and the bifurcating route 21 corresponding to the third group G3 is referred to as a third bifurcating route 21c. In addition, in the three opening and closing valves 20, the opening and closing valve 20 corresponding to the first bifurcating route 21a is referred to as a first opening and closing valve 20a, the opening and closing valve 20 corresponding to the second bifurcating route 21b is referred to as a second opening and closing valve 20b, and the opening and closing valve 20 corresponding to the third bifurcating route 21c is referred to as a third opening and closing valve 20c.

According to this air supply and exhaust unit 12, for example, in a case where the air is supplied to the air cell 15 of the first group G1, in a state where all of the second opening and closing valve 20b, the third opening and closing valve 20c, and the air exhaust valve 18 are closed, the first opening and closing valve 20a is opened, and the air is supplied from the pump 17 to the air cell 15 through the common route 22 and the first bifurcating route 21a. In a case where the air is exhausted from the air cell 15 of the first group G1, in a state where the second opening and closing valve 20b and the third opening and closing valve 20c are closed, the first opening and closing valve 20a and the air exhaust valve 18 are opened, and the air inside the air cell 15 is exhausted from the air exhaust valve 18 through the first bifurcating route 21a and the common route 22. The air can be similarly supplied and exhausted in the air cell 15 of the second group G2 and the air cell 15 of the third group G3.

A flow path diameter (flow path diameter of the connection route 19) of the air in the air supply and exhaust unit 12 is set to a diameter of 2 mm, for example.

The internal pressure measurement unit (pressure sensor) 13 measures the internal pressure of the air cell 15, and detects a state of the air cell 15. The single internal pressure measurement unit 13 is disposed for all of the air cells 15 in common. According to the present embodiment, the internal pressure measurement unit 13 measures the internal pressure of the air cells 15 through the connection route 19 for each of the groups G1 to G3. For example, when the internal pressure measurement unit 13 measures the internal pressure of the air cell 15 of the first group G1, in a state where all of the second opening and closing valve 20b, the third opening and closing valve 20c, and the air exhaust valve 18 are closed, and only the first opening and closing valve 20a is opened, thereby measuring the internal pressure of the air cell 15. For example, a plurality of the internal pressure measurement units 13 corresponding to the groups G1 to G3 of the air cells 15 may be disposed. In this case, the internal pressure measurement unit 13 can be disposed one by one for the multiple bifurcating routes 21. However, in a case where the single internal pressure measurement unit 13 is disposed, compared to a case of the multiple internal pressure measurement unit 13 are disposed, there is no change between pressure sensors, and calibration work can be quickly carried out. Accordingly, it is preferable to dispose the single internal pressure measurement unit 13.

The control unit (CPU) 14 acquires the internal pressure (detection result of the detection unit) of the air cell 15 from the internal pressure measurement unit 13, and controls the air supply and exhaust unit 12. The control unit 14 controls the pump 17, the air exhaust valve 18, and the opening and closing valve 20 in the air supply and exhaust unit 12.

Figure 6:
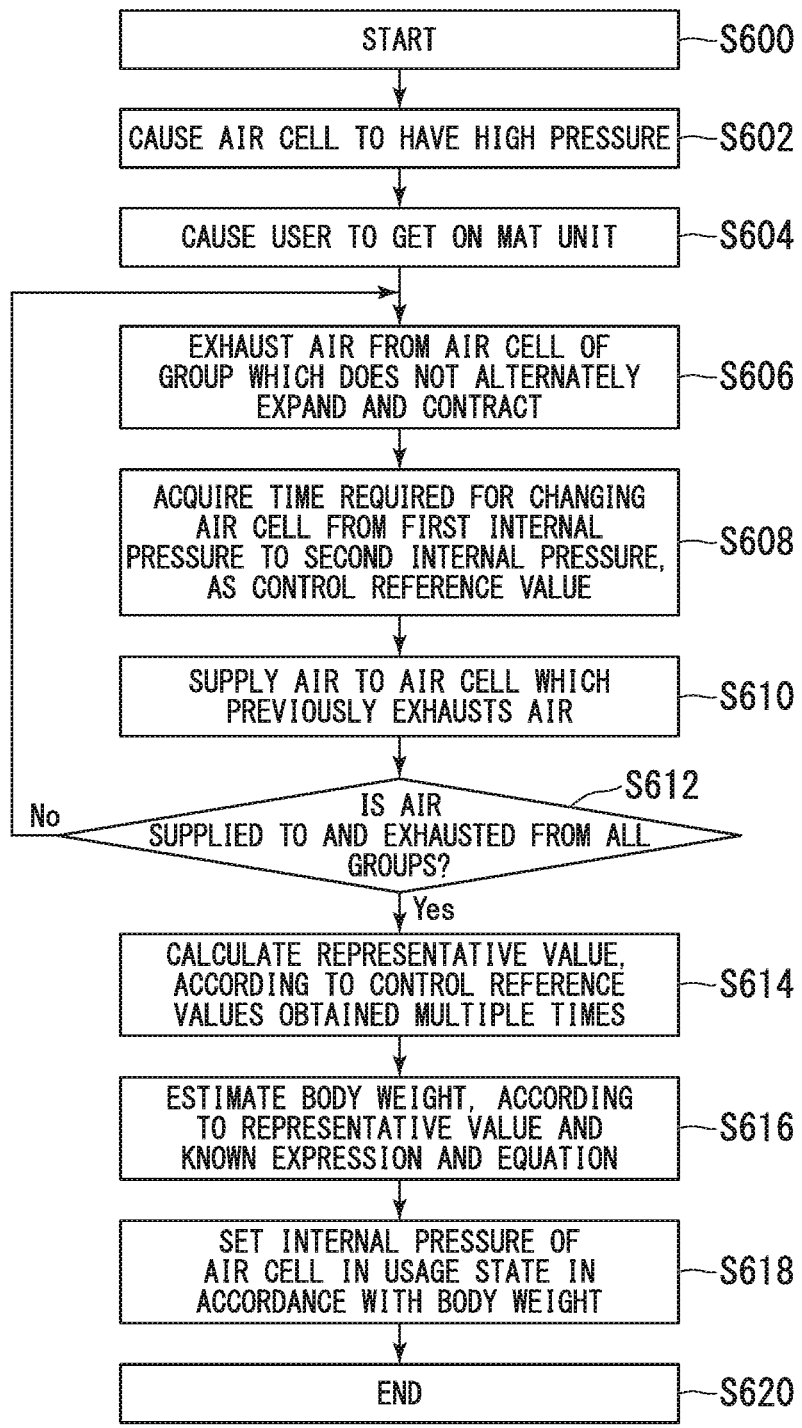
FIG. 6 is a flowchart showing an internal pressure setting method of the air cell in the air mat device according to the first embodiment of the present invention.

Next, an internal pressure setting method (internal pressure control method) of the air cell 15 in the air mat device 10 will be described with reference to a flowchart in FIG. 6. First, in order to start to set the internal pressure of the air cell 15, the air mat device 10 is actuated (Step S600). The control unit 14 is operated, thereby increasing the internal pressure of all of the air cells 15 so as to have high pressure (Step S602). Then, the user P gets on the air mat device 10 (Step S604). The air is exhausted from the air cell 15 of the group in which alternate expansion and contraction are not performed (Step S606). A time required for changing the air cell 15 from first internal pressure to second internal pressure is acquired as a control reference value (Step S608). Thereafter, the air is supplied to the air cell 15 which previously exhausts the air in Step S606 (Step S610).

It is confirmed whether the air is supplied to and exhausted from the air cells 15 in all of the groups G1 to G3 (Step S612). In a case where there is a group for which the air supply and exhaust are not performed (case of "No" on the flowchart), the above-described processes in Step S606 to Step S610 are performed on the air cell 15 belonging to the group. In a case where it is confirmed that the above-described processes in Step S606 to Step S610 are performed on the air cell 15 of all of the groups G1 to G3 (case of "Yes" on the flowchart), a representative value is calculated from the control reference values obtained multiple times (Step S614). Then, the body weight of the user P is estimated according to the representative value, and known expression and equation (Step S616). In accordance with the estimated body weight of the user P, the internal pressure of the air cell 15 in a usage state is set (Step S618). In this manner, the internal pressure of the air cell 15 in the air mat device 10 is completely set (Step S620).

The air mat device 10 is actuated by turning on a power source (not shown) (Step S600). After the power source is turned on, in an initial state before the user P lies (lays the body weight) on the mat unit 11, the control unit 14 controls the internal pressure in all of the air cells 15 so as to be relatively high pressure (for example, predetermined pressure of 4 to 5 kPa) (Step S602). In this manner, for example, even when the user P having the maximum useable body weight of the air mat device 10 gets on (lies on) the mat unit 11, it is possible to prevent the user P from sinking into the mat unit (body of the user P from sinking into the mat unit due to the excessively contracted air cell 15).

Figure 2:
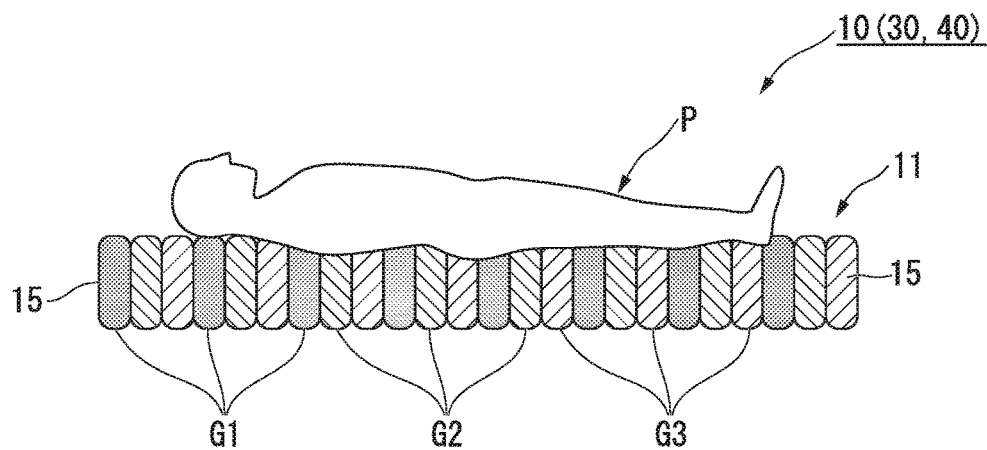
FIG. 2 is a side view showing a usage state where a user lies on a mat unit of the air mat device shown in FIG. 1.

As shown in FIG. 2, after the user P lays the body weight and lies on the mat unit 11 (Step S604), the control unit 14 causes each air cell 15 to alternately expand and contract in each of the groups G1 to G3. When the air is exhausted from each air cell 15, while the control unit 14 causes at least one of the multiple groups G1 to G3 to remain in a pressurized state, the control unit 14 causes others to exhaust the air, and thereafter, supplies the air to the groups G1 to G3 which previously exhaust the air.

Figure 3:
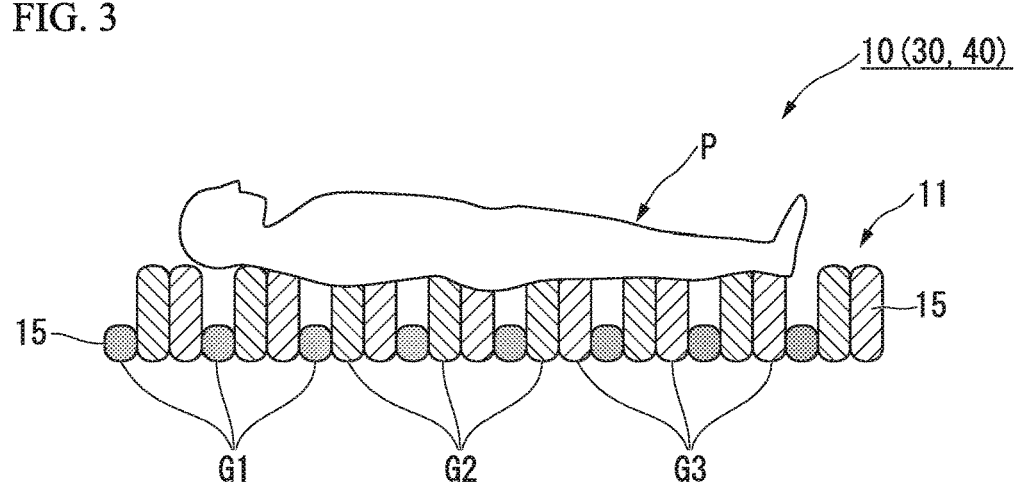
FIG. 3 is a side view showing a state where air is exhausted from an air cell of a first group configuring the mat unit for the air mat device in the usage state shown in FIG. 2.
Figure 4:
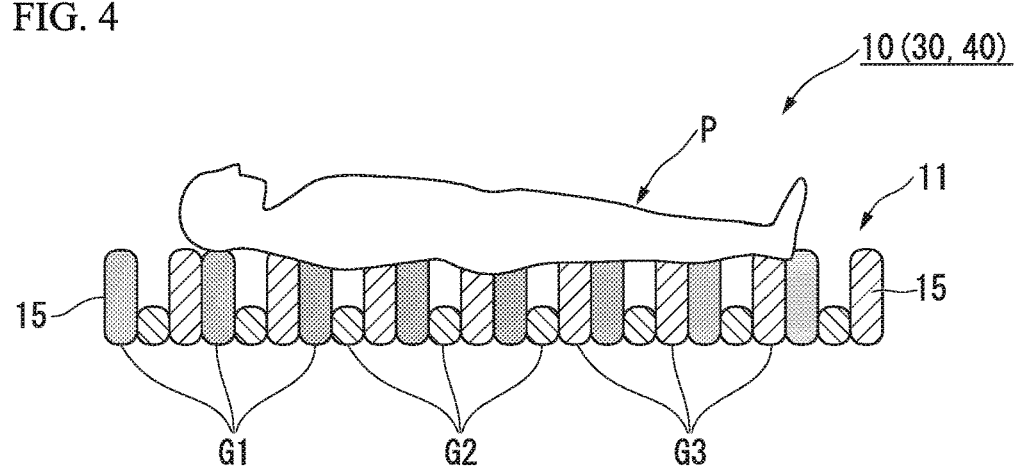
FIG. 4 is a side view showing a state where air is exhausted from an air cell of a second group configuring the mat unit for the air mat device in the usage state shown in FIG. 2.

According to the present embodiment, first, as shown in FIG. 3, the control unit 14 exhausts the air from only the air cell 15 of the first group G1 without exhausting the air from the air cells 15 of the second group G2 and the third group G3 (Step S606), and thereafter, supplies the air to the air cell 15 of the first group G1 (Step S610). Subsequently, as shown in FIG. 4, the control unit 14 exhausts the air from only the air cell 15 of the second group G2 without exhausting the air from the air cell 15 of the first group G1 and the third group G3, and thereafter, supplies the air to the air cell 15 of the second group G2. Then, as shown in FIG. 5, the control unit 14 exhausts the air from only the air cell 15 of the third group G3 without exhausting the air from the air cell 15 of the first group G1 and the second group G2, and thereafter, supplies the air to the air cell 15 of the third group G3.

Figure 5:
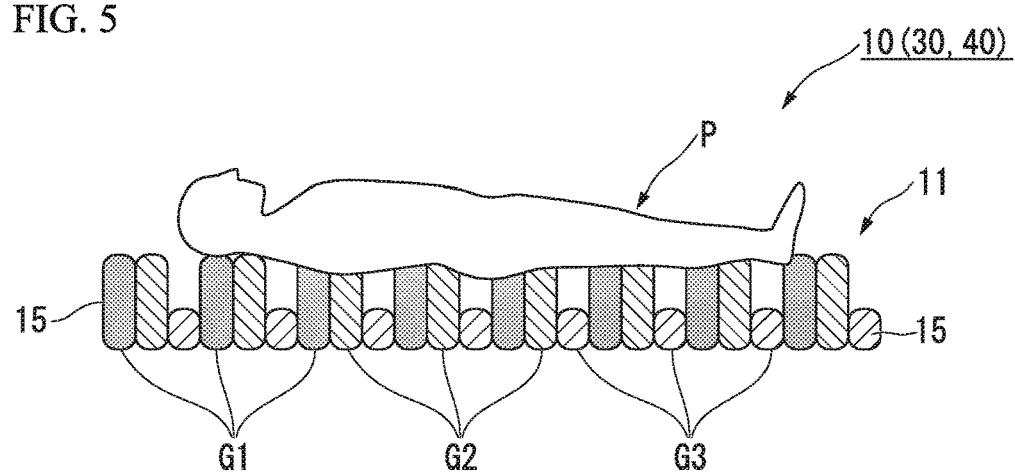
FIG. 5 is a side view showing a state where air is exhausted from an air cell of a third group configuring the mat unit for the air mat device in the usage state shown in FIG. 2.

In order to easily show whether or not the air is exhausted from the air cell 15, FIGS. 3 to 5 show a state where the air exhausted air cell 15 is completely separated from the user P. However, in actual, even in a state where some of the air cells 15 exhaust the air, the body of the user P comes into contact with the air exhausted air cell 15, thereby maintaining a state where a load is applied to the air cell 15 from the user P. That is, when the air cell 15 which does not exhaust the air is deformed by receiving the load from the user P, the body of the user P sinks into the mat unit 11. Accordingly, the body of the user P comes into contact with the air exhausted air cell 15, thereby maintaining the state where the load is applied to the air cell 15 from the user P.

For example, the air can be supplied to and exhausted from the air cell 15 of the respective groups G1 to G3 within approximately five minutes for each. In this case, the air can be supplied to and exhausted from all of the air cells 15 within approximately 15 minutes.

Here, in the air mat device 10 according to the present embodiment, in a state where the user P lays the body weight on the mat unit 11, the control unit 14 causes the air supply and exhaust unit 12 to exhaust the air. In this manner, while decompressing the air cell 15, the control unit 14 obtains a pressure changing time required for changing the internal pressure of the air cell 15 from the first internal pressure (first state) to the second internal pressure (second state) which is different from the first internal pressure and which is lower than the first internal pressure (Step S608). Then, the control unit 14 acquires the pressure changing time as the control reference value. According to the present embodiment, as described above, while causing the air cell 15 to alternately expand and contract in each of the groups G1 to G3, the control unit 14 acquires the pressure changing time. The first internal pressure and the second internal pressure can be set in advance.

That is, when causing the air cell 15 of the first group G1 to expand and contract, the control unit 14 obtains the pressure changing time for the air cell 15 belonging to the first group G1. When causing the air cell 15 of the second group G2 to expand and contract, the control unit 14 obtains the pressure changing time for the air cell 15 belonging to the second group G2. When causing the air cell 15 of the third group G3 to expand and contract, the control unit 14 obtains the pressure changing time for the air cell 15 belonging to the third group G3. In this way, when the air is supplied to and exhausted from each air cell 15, the control unit 14 changes a combination between an operation group which performs the air supply and exhaust and a maintenance group which does not perform the air supply and exhaust so as to obtain the pressure changing time multiple times (three times in the shown example) (Step S612).

Then, the control unit 14 sets the internal pressure of the air cell 15 which is suitable to the usage state where the air supply and exhaust unit 12 stops air supply and exhaust and the user P lays the body weight on the mat unit 11. According to the present embodiment, the control unit 14 sets the internal pressure of each air cell 15 which is suitable to the usage state, according to the pressure changing times obtained multiple times. The control unit 14 obtains the pressure changing time serving as the control reference value. That is, the control unit 14 obtains the pressure changing time since the time required for changing the air cell 15 from the first state to the second state varies in accordance with a load applied to the air cell 15. In this manner, it is possible to estimate the body weight of the user P. Therefore, the internal pressure of the air cell 15 in the usage state is set according to the pressure changing time. Accordingly, the internal pressure of the air cell 15 can be set in accordance with the body weight of the user P (Step S618).

When according to the pressure changing time, the control unit 14 obtains the internal pressure of the air cell 15 which is suitable to the usage state, the following procedure can be employed as an example. That is, first, the control unit 14 compares the pressure changing time with a pre-obtained correspondence relationship (for example, equation or expression) between the pressure changing time and the load applied to the air cell 15, thereby obtaining the body weight of the user P. Then, the control unit 14 sets the internal pressure of the air cell 15 which is suitable to the usage state, according to the body weight of the user P which is obtained in this way. In a case where the pressure changing time is obtained multiple times as in the present embodiment, each body weight of the user P is calculated, according to each pressure changing time. An average value, a median value, and a most frequent value are obtained from the calculation results as a representative value. In this manner, the representative value can be set to the body weight of the user P (Steps S614 and S616).

As described above, according to the air mat device 10 in the present embodiment, when the pressure changing time is obtained, the air supply and exhaust unit 12 and the internal pressure measurement unit 13 which are used for the generally-available air mat device 10 can be utilized without any change. Therefore, it is not necessary to newly provide a dedicated sensor in order to estimate the body weight of the user P. Accordingly, it is possible to limit an increase in cost.

In addition, the pressure changing time can be measured concurrently when the generally-available air mat device 10 normally performs the air supply and exhaust for the air cell 15, for example, when the generally-available air mat device 10 performs the air supply and exhaust for the air cell 15 in order to intentionally change a posture of the user P. In this case, it is possible to minimize a human operation or a machinery operation which is needed to estimate the body weight of the user P.

In addition, in order to obtain the body weight of the user P, the air mat device 10 measures the internal pressure change of the air cell 15 instead of directly measuring the body weight of the user P. Therefore, if the user P lays the body weight on the mat unit 11 within a fixed range in which the internal pressure of the air cell 15 is changed to the same extent, the body weight of the user P can be accurately estimated without depending on a position of the user P on the mat unit 11.

Furthermore, the air mat device 10 estimates the body weight of the user P by measuring the time required for a predetermined internal pressure change when the air is supplied to and exhausted from the air cell 15. This internal pressure change occurs within a short time. Accordingly, it is possible to restrain a load from being continuously applied to the internal pressure measurement unit 13 measuring the internal pressure of the air cell 15 over a long period of time. Accordingly, a state where the internal pressure measurement unit 13 remains calibrated can be easily maintained.

As described above, according to the air mat device 10 in the present embodiment, the body weight of the user P can be accurately reflected on the internal pressure of the air cell 15.

In addition, the air mat device 10 estimates the body weight of the user P by measuring the internal pressure when the air is supplied to and exhausted from the air cell 15. Accordingly, while the user P lays the body weight on the mat unit 11, the body weight of the user P can be estimated. Therefore, for example, compared to a case where the user P lying or sitting on the mat unit 11 temporarily leaves away from the mat unit 11 in order to estimate the body weight of the user P and the user P lies or sits again on the mat unit 11, it is possible to reduce burden on the user P. For example, in a case where the user P needs care or nursing, it is also possible to reduce burden on a caregiver or a nursing attendant.

Furthermore, the air mat device 10 according to the present embodiment estimates the body weight of the user P while maintaining a state where the user P lays the body weight on the mat unit 11. Accordingly, for example, even if the user P needs the care or the nursing and the user P has to stay in a state of lying or sitting on the mat unit 11 for a long period of time, it is possible to suitably adjust the internal pressure of the air cell 15 in accordance with the body weight whenever necessary.

In addition, as in the present embodiment, in a case where as the control reference value, the control unit 14 acquires the time required for changing the air cell 15 from the first internal pressure (first state) to the second internal pressure (second state), the body weight of the user P can be estimated in an intermediate stage until the state of the air cell 15 is completely changed after the state of the air cell 15 starts to be changed, for example, even in an intermediate stage until the air cell 15 completes the alternate expansion and contraction after the air cell 15 starts the alternate expansion and contraction. In this case, it is possible to shorten the time required for estimating the body weight of the user P.

In addition, when the control unit 14 acquires the control reference value, the control unit 14 causes the air supply and exhaust unit 12 to supply and exhaust the air. When the air is exhausted from the air cell 15, while at least one of the multiple groups G1 to G3 remains, other groups exhaust the air. Thereafter, the air is supplied to the group which previously exhausts the air. Accordingly, the control reference value can be acquired concurrently with the alternate expansion and contraction. In this manner, it is possible to restrain influences on a comfortable feeling of the user P on the bed, and it becomes possible to minimize a special operation or work of the user P. Therefore, improved usability can be achieved.

In addition, as described above, while remaining at least a part of the groups G1 to G3, the control unit 14 exhausts the air from the air cell 15. Accordingly, the user P can be supported by the air cell 15 of the groups G1 to G3 which do not exhaust the air. Therefore, it is possible to prevent the user P from sinking into the mat unit 11.

Furthermore, the control unit 14 sets the internal pressure of the air cell 15 in the usage state, according to the pressure changing times obtained multiple times. Accordingly, for example, it is possible to reduce errors caused by disturbance, and the body weight of the user P can be accurately estimated. Moreover, it is possible to set the internal pressure of the air cell 15.

Modification Example of First Embodiment

Embodiments of the present invention can be appropriately modified to another form in which the control unit 14 acquires the time required for changing the air cell 15 from the first state to the second state as the control reference value so as to control the air supply and exhaust unit 12 in accordance with the control reference value.

First Modification Example

According to the first embodiment, in a state where the user P lays the body weight on the mat unit 11, the control unit 14 causes the air supply and exhaust unit 12 to exhaust the air. In this manner, while the air cell 15 is decompressed, the control unit 14 obtains the pressure changing time until the internal pressure of the air cell 15 is changed from the first internal pressure to the second internal pressure. However, embodiments of the present invention are not limited to this aspect only.

In a state where the user P lays the body weight on the mat unit 11, the control unit 14 causes the air supply and exhaust unit 12 to supply the air. In this manner, while the air cell 15 is pressurized, the control unit 14 may obtain the pressure changing time until the internal pressure of the air cell 15 is changed from the first internal pressure to the second internal pressure which is different from the first internal pressure and which is higher than the first internal pressure. Then, according to the pressure changing time, it is possible to set the internal pressure of the air cell 15 which is suitable to the usage state. In this case, it is preferable that the pump 17 is continuously operated with constant driving force and an air supply and exhaust quantity is maintained to have a constant value.

Second Modification Example

According to the first embodiment and the first modification example, the control unit 14 acquires the time required for changing the internal pressure of the air cell 15 from the first internal pressure to the second internal pressure. However, it is also possible to employ a form in which the control unit 14 acquires a time required for changing the air cell 15 from a first state to a second state as the control reference value instead of the internal pressure.

For example, a displacement meter for detecting a height of an upper surface (surface in contact with a user) of the air cell 15 is disposed as a detection unit. In this manner, it is also possible to acquire a time required for changing the height of the upper surface of the air cell 15 from a first height (first state) to a second height (second state) as the control reference value.

In addition, a flowmeter (anemometer) for detecting a flow rate (flow velocity) of the air which is supplied to and exhausted from the air cell 15 is disposed as a detection unit. In this manner, it is also possible to acquire a time required for changing the flow rate of the air from a first flow rate (first state) to a second flow rate (second state) as the control reference value.

Furthermore, a load sensor for detecting a magnitude of a load applied to the air cell 15 is disposed as a detection unit. In this manner, it is also possible to acquire a time required for changing the load applied to the air cell 15 from a first load to a second load as the control reference value.

Third Modification Example

According to the first embodiment, the first modification example, and the second modification example, for example, in a state where the user P lays the body weight on the mat unit 11 in advance, the air supply and exhaust unit 12 supplies and exhausts the air to and from the air cell 15, and changes a state of the air cell 15, thereby allowing the control unit 14 to acquire the control reference value. However, embodiments of the present invention are not limited to this aspect only.

For example, the control unit 14 can also acquire the control reference value by utilizing a state change of the air cell 15 when a mode is changed from a state where the user P does not get on the mat unit 11 to a state where the user P gets on the mat unit 11. In this case, it is preferable that the influence (noise) caused by impact force (position energy or velocity energy) independent of the load of the user P, which is applied to the air cell 15 when the user P gets on the mat unit 11, is eliminated from the control reference value. As the elimination method, for example, it is conceivable to exclude a fixed time (noise riding time) from when the state starts to be changed, from a measurement range. Alternatively, change amounts detected in a case of the riding noise obtained from a test in advance are recorded in a program. In this manner, it is conceivable to employ a method of estimating the control reference value with reference to the change amounts, a method of collecting sufficiently more samples for averaging, or a method of eliminating the noise from the control reference value.

Second Embodiment

Next, an air mat device 30 according to a second embodiment of the present invention will be described.

In the second embodiment, the same reference numerals will be given to configuration elements which are the same as those in the first embodiment, description thereof will be omitted, and only different points will be described. With regard to configurations other than the control unit 14, the air mat device 30 according to the present embodiment is similar to the air mat device 10 according to the first embodiment shown in FIG. 1.

Figure 7:
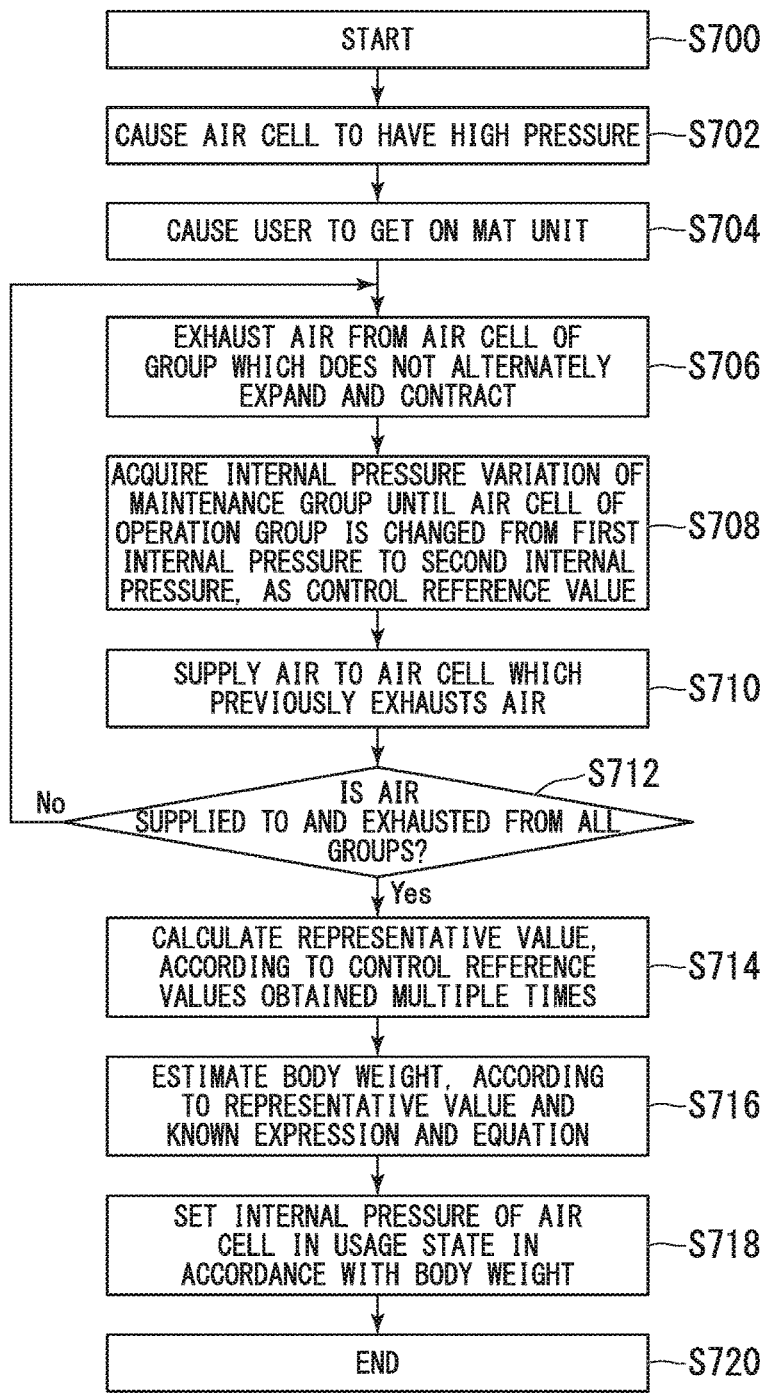
FIG. 7 is a flowchart showing an internal pressure setting method of the air cell in the air mat device according to the second embodiment of the present invention.

An internal pressure setting method of the air cell 15 according to the air mat device 30 will be described with reference to a flowchart in FIG. 7 (refer to FIG. 7). First, in order to start to set the internal pressure of the air cell 15, the air mat device 30 is actuated (Step S700). The control unit 14 is operated, thereby increasing the internal pressure of all of the air cells 15 so as to have high pressure (Step S702). Then, the user P gets on the air mat device 30 (Step S704). The air is exhausted from the air cell 15 of the group in which alternate expansion and contraction are not performed (Step S706). An internal pressure change of the air cell 15 of the maintenance group until the air cell 15 of the operation group is changed from the first internal pressure to the second internal pressure is acquired as a control reference value (Step S708). Thereafter, the air is supplied to the air cell 15 which previously exhausts the air in Step S706 (Step S710).

It is confirmed whether the air is supplied to and exhausted from the air cells 15 in all of the groups G1 to G3 (Step S712). In a case where there is a group for which the air supply and exhaust are not performed (case of "No" on the flowchart), the above-described processes in Step S706 to Step S710 are performed on the air cell 15 belonging to the group. In a case where it is confirmed that the above-described processes in Step S706 to Step S710 are performed on the air cell 15 of all of the groups G1 to G3 (case of "Yes" on the flowchart), a representative value is calculated from the control reference values obtained multiple times (Step S714). Then, the body weight of the user P is estimated according to the representative value, and known expression and equation (Step S716). In accordance with the estimated body weight of the user P, the internal pressure of the air cell 15 in a usage state is set (Step S718). In this manner, the internal pressure of the air cell 15 in the air mat device 30 is completely set (Step S720).

The air mat device 30 is actuated by turning on the power source (Step S700). After predetermined pressure is applied to the air cell 15 (Step S702) and the user P lies and lays the body weight on the mat unit 11 (Step S704), in a state where a load is applied to the air cell 15 by laying at least a part of the body weight of the user P on the air cell 15, the control unit 14 causes the air cell 15 to alternately expand and contract in each of the groups G1 to G3, thereby changing a state of the air cell 15.

Here, according to the air mat device 30, in a state where the user P lays the body weight on the mat unit 11, the control unit 14 acquires the internal pressure change (state change quantity of the air cell 15) in each air cell 15 of the maintenance group which does not perform air supply and exhaust as the control reference value, until the internal pressure of each air cell 15 of the operation group which performs air supply and exhaust is changed from the first internal pressure to the second internal pressure which is different from the first internal pressure and which is lower than the first internal pressure (Step S708). According to the present embodiment, as described above, the control unit 14 obtains the internal pressure change while causing the air cell 15 to alternately expand and contract in each of the groups G1 to G3.

That is, when the control unit 14 causes the air cell 15 of the first group G1 (operation group) to expand and contract, the control unit 14 first measures the internal pressure of the air cell 15 of the second group G2 and the third group G3 (maintenance group) when the air cell 15 of the first group G1 has the first internal pressure. At this time, in a state where the first opening and closing valve 20a and the air exhaust valve 18 are closed, the control unit 14 opens the second opening and closing valve 20b and the third opening and closing valve 20c. In this manner, the control unit 14 can cause the internal pressure measurement unit 13 to measure the internal pressure of the air cell 15 of the second group G2 and the third group G3 (Step S706).

Subsequently, the air cell 15 is decompressed until the internal pressure of the first group G1 is changed to the second internal pressure. The control unit 14 measures the internal pressure of the air cell 15 of the second group G2 and the third group G3 at this time, thereby obtaining the internal pressure change in each air cell 15 of the maintenance group. Thereafter, the air is supplied to the air cell 15 which previously exhausts the air (Step S710).

Similarly, when the control unit 14 causes the air cell 15 of the second group G2 (operation group) to expand and contract, the control unit 14 obtains the internal pressure change in each air cell 15 of the first group G1 and the third group G3 (maintenance group). When the control unit 14 causes the air cell 15 of the third group G3 (operation group) to expand and contract, the control unit 14 obtains the internal pressure change in each air cell 15 of the first group G1 and the second group G2 (maintenance group).

When the control unit 14 causes the air cell 15 of the first group G1 (operation group) to expand and contract, the control unit 14 can also obtain the internal pressure change in each air cell 15 of either the second group G2 or the third group G3 (maintenance group). Similarly, when the control unit 14 causes the air cell 15 of the second group G2 (operation group) to expand and contract, the control unit 14 can also obtain the internal pressure change in each air cell 15 of either the first group G1 or the third group G3 (maintenance group). In addition, when the control unit 14 causes the air cell 15 of the third group G3 (operation group) to expand and contract, the control unit 14 can also obtain the internal pressure change in each air cell 15 of either the first group G1 or the second group G2 (maintenance group).

In this way, when the air is supplied to and exhausted from each air cell 15, the control unit 14 obtains the internal pressure change multiple times (three times in the shown example) by changing a combination between any one of the operation groups G1 to G3 which perform air supply and exhaust and any one of the maintenance groups which do not perform air supply and exhaust (Step S712).

Then, the control unit 14 sets the internal pressure of the air cell 15 in the usage state, according to the internal pressure change. According to the present embodiment, the control unit 14 sets the internal pressure of each air cell 15 in the usage state, according to the internal pressure changes obtained multiple times. The internal pressure change serving as the control reference value, that is, the state change quantity of the air cell 15 varies in accordance with a load applied to the air cell 15. Accordingly, the body weight of the user P can be estimated by obtaining the internal pressure change. Therefore, the internal pressure of the air cell 15 in the usage state is set according to the internal pressure change. Accordingly, the internal pressure of the air cell 15 can be set in accordance with the body weight of the user P (Step S718).

When the control unit 14 obtains the internal pressure of the air cell 15 in the usage state, according to the internal pressure change, for example, the control unit 14 first compares the internal pressure change with a pre-obtained correspondence relationship between the internal pressure change and the load applied to the air cell 15, thereby obtaining the body weight of the user P. Then, the control unit 14 sets the internal pressure of the air cell 15 in the usage state, according to the body weight of the user P which is obtained in this way. In a case where the internal pressure change is obtained multiple times as in the present embodiment, each body weight of the user P is calculated, according to each internal pressure change. An average value, a median value, and a most frequent value are obtained from the calculation results as a representative value. In this manner, the representative value can be set to the body weight of the user P (Steps S714 and S716).

Modification Example of Second Embodiment

Embodiments of the present invention can be appropriately modified to another form in which in a state where a load is applied to the air cell 15 by laying at least a part of the body weight of the user P on the air cell 15, the control unit 14 acquires a state change quantity of the air cell 15 as the control reference value while changing a state of the air cell 15, and in which the control unit 14 controls the air supply and exhaust unit 12 in accordance with the control reference value.

First Modification Example

According to the second embodiment, in a state where the user P lays the body weight on the mat unit 11, while the air cell 15 of the operation group is decompressed, the control unit 14 obtains the internal pressure change of the maintenance group until the internal pressure of the air cell 15 of the operation group is changed from the first internal pressure to the second internal pressure. However, embodiments of the present invention are not limited to this aspect only.

In a state where the user P lays the body weight on the mat unit 11, while the air cell 15 of the operation group is pressurized, the control unit 14 may obtain the internal pressure change of the maintenance group until the internal pressure of the air cell 15 of the operation group is changed from the first internal pressure to the second internal pressure which is different from the first internal pressure and which is higher than the first internal pressure. Then, the internal pressure of the air cell 15 in the usage state can also be set according to the internal pressure change. In this case, it is preferable that the pump 17 is continuously operated with constant driving force and an air supply and exhaust quantity is maintained to have a constant value.

Second Modification Example

According to the second embodiment and the first modification example, in a state where the user P lays the body weight on the mat unit 11, as the control reference value, the control unit 14 acquires the internal pressure change (state change quantity of the air cell 15) in each air cell 15 of the maintenance group until the internal pressure in each air cell 15 of the operation group is changed from the first internal pressure to the second internal pressure. However, embodiments of the present invention are not limited to this aspect only. Embodiments of the present invention can employ a form in which in a state where a load is applied to the air cell 15 by laying at least a part of the body weight of the user P on the air cell 15, the control unit 14 acquires the state change quantity of the air cell 15 as the control reference value while actively changing a state of the air cell 15.

For example, a sensor for detecting a range of the air cell 15 to which a load is applied is disposed as a detection unit. In this manner, the control unit 14 can also acquire the internal pressure change in the air cell 15 as the control reference value when the range of the air cell 15 to which the load is applied is changed from a first range to a second range. In a case where the multiple air cells 15 are provided, each one of the air cells 15 functions as a single unit of the air cells 15. In this manner, the control unit 14 can detect the range of the air cell 15 to which the load is applied, according to the number of the air cells 15. In this case, for example, in order to narrow the range of the air cell 15 to which the load is applied, it is possible to employ a method of causing the air supply and exhaust unit 12 to decrease the internal pressure of some of the air cells 15 so that the load is not applied to the corresponding air cells 15.

In addition, a sensor for detecting a position of the air cell 15 which relates to a shape of the mat unit 11 is disposed as a detection unit. In this manner, the control unit 14 can also acquire the internal pressure change in the air cell 15 as the control reference value when the shape of the mat unit 11 is changed from a first shape to a second shape. The shape of the mat unit 11 includes a flat shape which is a shape in a standard state, a back-raised shape, a feet-raised shape, or each shape in a rotation state. According to the mat unit 11 in a back-raised state, a head side from a lumbar region corresponding to a user's waist in the mat unit 11 is raised and inclined from the lumbar region functioning as a starting point. According to the mat unit 11 in a feet-raised state, a knee back region corresponding to the user's knee in the mat unit 11 is bent from the lumbar region to the feet side so as to protrude upward. According to the mat unit 11 in a rotation state, laterally one side in the mat unit 11 is raised so that the user can be brought into a state where the user laterally tilts the user's body on the mat unit 11.

A sensor for detecting a position of the air cell 15 which relates to an inclined angle of the mat unit 11 is disposed as a detection unit. In this manner, the control unit 14 can also acquire the internal pressure change in the air cell 15 as the control reference value when the inclined angle of the mat unit 11 is changed from a first inclined angle to a second inclined angle. The mat unit 11 is inclined from a horizontal plane in a Trendelenburg state (extended state) or in a reverse Trendelenburg state. According to the mat unit 11 in the Trendelenburg state, the mat unit 11 is longitudinally so that the head side is lower than the feet side in the mat unit 11. According to the mat unit 11 in the reverse Trendelenburg state, the mat unit 11 is longitudinally inclined so that the feet side is lower than the head side in the mat unit 11.

In addition, a sensor for detecting a height of an upper surface of the air cell 15 is disposed as a detection unit. In this manner, the control unit 14 can also acquire the internal pressure change in the air cell 15 as the control reference value when the height of the upper surface of the air cell 15 is changed from a first height to a second height.

Third Modification Example

According to the second embodiment, the first modification example, and the second modification example, the control unit 14 acquires the control reference value by obtaining the internal pressure change in the air cell 15. However, embodiments of the present invention are not limited to this aspect only. For example, a load sensor for measuring a load applied to some air cells 15 in the multiple air cells 15 may be provided as a detection unit. In this manner, the control unit 14 can also acquire the control reference value by obtaining a change in the load applied to the load sensor.

Third Embodiment

Next, an air mat device 40 according to a third embodiment of the present invention will be described.

In the third embodiment, the same reference numerals will be given to configuration elements which are the same as those in the first embodiment, description thereof will be omitted, and only different points will be described. With regard to configurations other than the control unit 14, the air mat device 40 according to the present embodiment is similar to the air mat device 10 according to the first embodiment shown in FIG. 1.

Figure 8:
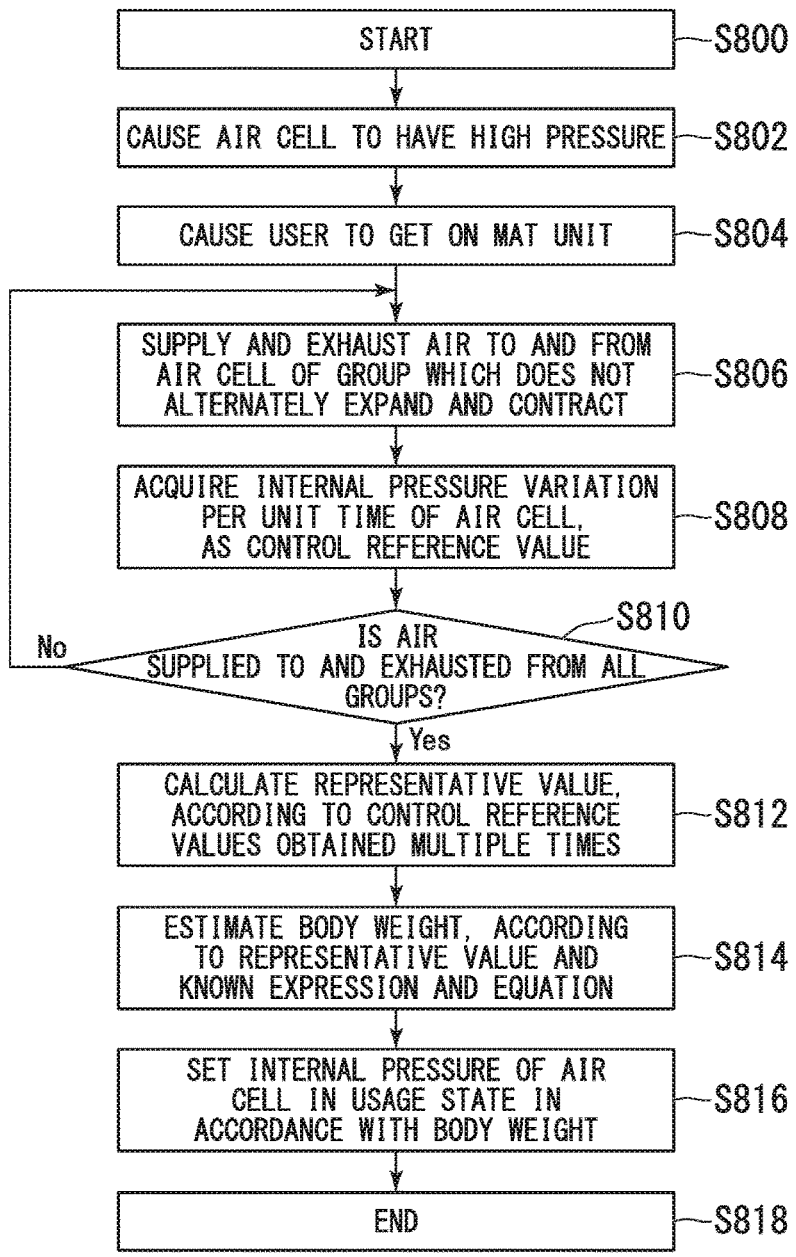
FIG. 8 is a flowchart showing an internal pressure setting method of the air cell in the air mat device according to the third embodiment of the present invention.

An internal pressure setting method of the air cell 15 according to the air mat device 40 will be described with reference to a flowchart in FIG. 8. First, in order to start to set the internal pressure of the air cell 15, the air mat device 40 is actuated (Step S800). The control unit 14 is operated, thereby increasing the internal pressure of all of the air cells 15 so as to have high pressure (Step S802). Then, the user P gets on the air mat device 40 (Step S804). The air is exhausted from the air cell 15 of the group in which alternate expansion and contraction are not performed (Step S806). The internal pressure change per unit time of the air cell 15 is acquired as the control reference value (Step S808).

It is confirmed whether the air is supplied to and exhausted from the air cells 15 in all of the groups G1 to G3 (Step S810). In a case where there is a group for which the air supply and exhaust are not performed (case of "No" on the flowchart), the above-described processes in Step S806 to Step S808 are performed on the air cell 15 belonging to the group. In a case where it is confirmed that the above-described processes in Step S806 to Step S808 are performed on the air cell 15 of all of the groups G1 to G3 (case of "Yes" on the flowchart), a representative value is calculated from the control reference values obtained multiple times (Step S812). Then, the body weight of the user P is estimated according to the representative value, and known expression and equation (Step S814). The internal pressure of the air cell 15 in the usage state is set in accordance with the estimated body weight of the user P (Step S816). In this manner, the internal pressure of the air cell 15 in the air mat device 40 is completely set (Step S818).

The air mat device 40 is actuated by turning on the power source (Step S800). After predetermined pressure is applied to the air cell 15 (Step S802) and the user P lies and lays the body weight on the mat unit 11 (Step S804), in a state where a load is applied to the air cell 15 by laying at least a part of the body weight of the user P on the air cell 15, the control unit 14 causes the air cell 15 to alternately expand and contract in each of the groups G1 to G3, thereby changing a state of the air cell 15.

Here, as the control reference value, the air mat device 40 acquires the internal pressure change serving as the state change quantity per unit time with regard to the air cell 15. According to the present embodiment, the air mat device 40 obtains the internal pressure change per unit time with regard to the air cell 15 of the groups G1 to G3 which expand and contract in the multiple air cells 15.

The unit time can be set optionally. In addition, the internal pressure change per unit time can be obtained multiple times when the air cell 15 of any one group in the groups G1 to G3 expands and contracts. For example, immediately after the air cell 15 starts to contract, the internal pressure change per unit time can be obtained. In addition, before and after the air cell 15 is changed from contraction to expansion, the internal pressure change per unit time can be obtained. Furthermore, immediately before the air cell 15 completes the expansion, the internal pressure change per unit time can be obtained. That is, as the internal pressure change per unit time of the air cell 15, any internal pressure change obtained when the air is supplied or when the air is exhausted can be employed. For example, as a trigger to start air supply or air exhaust for the air cell 15, it is possible to obtain the internal pressure change from a start time (first time) until a predetermined unit time elapses (second time) (Step S806).

The control unit 14 obtains the internal pressure change per unit time multiple times (three times in the shown example) by changing a combination between any one of the operation groups G1 to G3 which perform air supply and exhaust and the maintenance group which does not perform air supply and exhaust (Steps S808 and S810).

Then, the control unit 14 sets the internal pressure of the air cell 15 in the usage state, according to the internal pressure change per unit time (Step S812). According to the present embodiment, the control unit 14 sets the internal pressure of each air cell 15 in the usage state, according to the internal pressure changes per unit time which are obtained multiple times. The internal pressure change per unit time which serves as the control reference value, that is, the state change quantity of the air cell 15 varies in accordance with a load applied to the air cell 15. Accordingly, the body weight of the user P can be estimated by obtaining the internal pressure change per unit time. Therefore, the internal pressure of the air cell 15 in the usage state is set according to the internal pressure change per unit time. Accordingly, the internal pressure of the air cell 15 can be set in accordance with the body weight of the user P.

When the control unit 14 obtains the internal pressure of the air cell 15 in the usage state, according to the internal pressure change per unit time, for example, the control unit 14 first compares the internal pressure change per unit time with a pre-obtained correspondence relationship between the internal pressure change per unit time and the load applied to the air cell 15, thereby obtaining the body weight of the user P (Step S814). Then, the control unit 14 sets the internal pressure of the air cell 15 in the usage state, according to the body weight of the user P which is obtained in this way (Step S816).

Modification Example of Third Embodiment

Embodiments of the present invention can be appropriately modified to another form in which the control unit 14 acquires a state change quantity per unit time of the air cell 15 as the control reference value and the control unit 14 controls the air supply and exhaust unit 12 in accordance with the control reference value.

First Modification Example

The third embodiment employs the internal pressure change of the air cell 15 as the state change quantity of the air cell 15. However, embodiments of the present invention are not limited to this aspect only.

For example, as the state change quantity of the air cell 15, a flow rate of the air supplied to and exhausted from the air cell 15 per unit time, a displacement amount of the height of the upper surface of the air cell 15 which is displaced per unit time, and a change quantity of the load applied to the air cell 15 which varies per unit time can also be acquired as the control reference value.

Second Modification Example

According to the third embodiment and the first modification example, in a state where the user P lays the body weight on the mat unit 11, the control unit 14 acquires the control reference value by actively changing a state of the air cell 15. However, embodiments of the present invention are not limited to this aspect only. For example, the control unit 14 can also acquire the control reference value by utilizing a state change of the air cell 15 when a state is changed from a state where the user P does not get on the mat unit 11 to a state where the user P gets on the mat unit 11.

The technical scope of the present invention is not limited to the above-described embodiments, and various modifications can be added to the present invention within the scope not departing from the gist of the present invention.

According to the above-described embodiments, the control reference value is acquired concurrently with the alternate expansion and contraction of the air cell 15. However, embodiments of the present invention are not limited thereto. For example, the internal pressure of the air cell 15 can also be set by acquiring the control reference value during a human operation (pressing a button for automatically setting the body weight at timing that a user wants to set the internal pressure of the air cell 15).

In addition, the multiple air cells 15 can be respectively arranged so as to correspond to the head, the shoulder, the hip, the thigh, the knee, and the heel of the user P who lies on the mat unit 11. In this case, the internal pressure of the air cell 15 is adjusted depending on each region of the body. In this manner, for example, body pressure can be more effectively dispersed by increasing the internal pressure of the air cell 15 in the shoulder and the thigh than the internal pressure of the air cell 15 in the hip.

In addition, as the mat unit 11, a configuration can also be adopted which includes only one air cell 15.

According to the above-described embodiments, the control unit 14 controls the air supply and exhaust unit 12 in accordance with the acquired control reference value. However, a configuration can also be utilized as a weighing scale by estimating the body weight of the user P, according to the acquired control reference value. In this case, the body weight of the user P is separately input in advance. A configuration can also be utilized as a failure detection function by comparing the input body weight with the estimated body weight. In addition, in a case where the body weight of the user P is estimated as 0 kg, a configuration can also be utilized as a bed leaving sensor for determining that the user P does not get on the mat unit 11. In this case, it is also possible to utilize a power-saving mode for causing the control unit 14 to stop the alternate expansion and contraction. In addition, for example, after the control unit 14 determines that the user P gets on the mat unit 11 by utilizing a function as the bed leaving sensor, the control unit 14 can also start to control the internal pressure of the air cell 15. That is, a configuration can be adopted in which the control reference value is acquired after the control unit 14 detects that the user P gets on the mat unit 11 (that a load is applied to the air cell 15).

In addition, in a case where the body weight of the user P is known already, it is also possible to estimate a shape or an inclined angle of the mat unit 11 from the control reference value by utilizing a fact that the body weight of the user P can be estimated from the control reference value. That is, for example, if in the air cell 15 in the back-raised state, a relationship among the body weight of the user P, the internal pressure of the air cell 15, and the shape or the inclined angle of the mat unit 11, and the body weight of the user P are acquired in advance, the shape or the inclined angle of the mat unit 11 can be recognized by measuring the internal pressure of the air cell 15.

According to the above-described embodiment, an example has been described where the air mat device 10 has the air cell 15 which performs the air supply and exhaust. However, embodiments of the present invention can also be applied to a fluid mat device having a fluid cell containing a fluid, such as a so-called water bed.

In addition, within the scope not departing from the gist of embodiments of the present invention, the configuration elements according to the above-described embodiments can be appropriately replaced with known configuration elements. In addition, the above-described modification examples can be appropriately combined with each other.

Next, a verification test of at least one embodiment of the present invention will be described.

As the verification test, five verification tests from a first verification test to a fifth verification test are carried out.

In the first verification test and the second verification test, a relationship is verified between a load applied to the air cell 15 and a time required for decompressing the air cell 15.

In the third verification test and the fourth verification test, a relationship is verified between the load applied to the air cell 15 and a time required for pressurizing the air cell 15.

In the fifth verification test, a pressure change in the maintenance group when the air is exhausted from the air cell 15 of the operation group is verified.

In the first verification test, a human-body-shaped base plate in a plan view is placed on the mat unit 11 in the air mat devices 10 and 30 shown in FIG. 1. A predetermined number of plate-shaped weights are stacked on the base plate so as to apply a load to the air cell 15. Three types of loads such as 30 kg, 59 kg, and 78 kg are separately applied to the air cells 15. Then, the internal pressure of the air cell 15 in the first group G1 is decompressed so as to measure a relationship between the internal pressure of the air cell 15 and a time.

Figure 9:
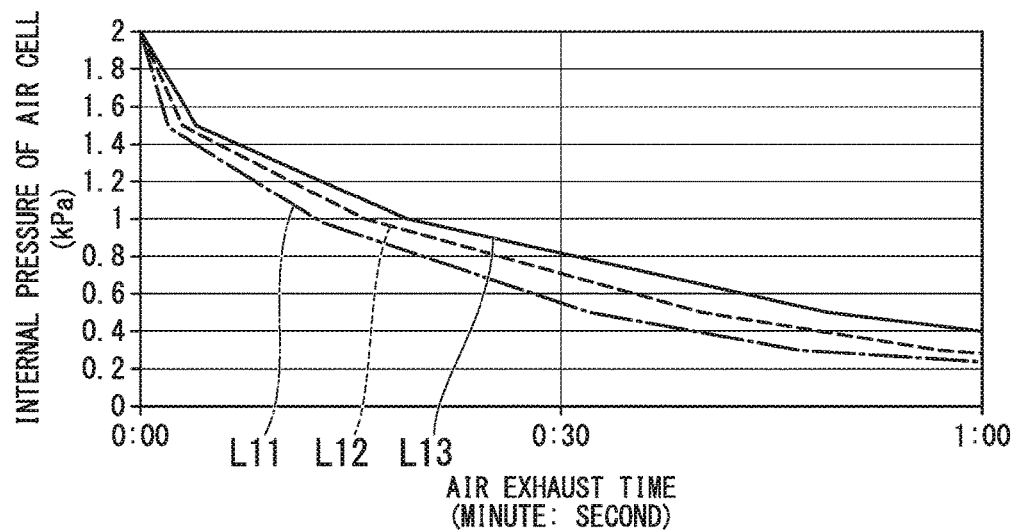
FIG. 9 is a graph showing a result of a first verification test for verifying an effect of an embodiment of the present invention, and is a graph showing a relationship between internal pressure and an air exhaust time of the air cell for each load applied to the air cell.

FIG. 9 shows the result. In a graph in FIG. 9, a horizontal axis represents an air exhaust time (minute: second), and a vertical axis represents the internal pressure (kPa) of the air cell 15 in the first group G1. A graph line L11 in the graph represents a case of the load 30 kg, a graph line L12 represents the load 59 kg, and a graph line L13 represents the load 78 kg.

As shown in FIG. 9, it is confirmed that a long time is needed in decreasing the internal pressure of the air cell 15 as the load applied to the air cell 15 is heavier.

In the second verification example, instead of the air mat device 10 shown in FIG. 1, an air cell having one air chamber is employed as the air cell. A load is applied to the air cell by using a pressure standard instrument stipulated in JIS T9256-3. Three types of load such as 7 kg, 17 kg, and 28 kg are applied to the air cell.

Then, the internal pressure of the air cell is decompressed so as to measure a relationship between the internal pressure of the air cell and the time.

Figure 10:
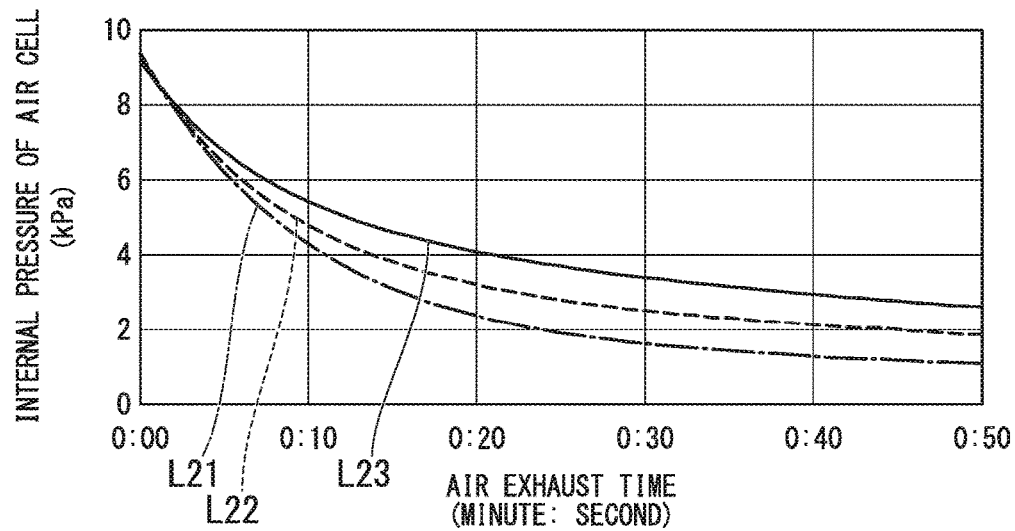
FIG. 10 is a graph showing a result of a second verification test for verifying an effect of an embodiment of the present invention, and is a graph showing a relationship between the internal pressure and the air exhaust time of the air cell for each load applied to the air cell.

FIG. 10 shows the result. In a graph in FIG. 10, the horizontal axis represents an air exhaust time (minute: second), and the vertical axis represents the internal pressure (kPa) of the air cell. A graph line L21 in the graph represents a case of the load 7 kg, a graph line L22 represents the load 17 kg, and a graph line L23 represents the load 28 kg.

As shown in FIG. 10, it is confirmed that a long time is needed in decreasing the internal pressure of the air cell as the load applied to the air cell is heavier.

In the third verification test, after a test environment which is the same as that of the first verification test is prepared, the internal pressure of the air cell 15 in the first group G1 is pressurized so as to measure a relationship between the internal pressure of the air cell 15 and the time.

Figure 11:
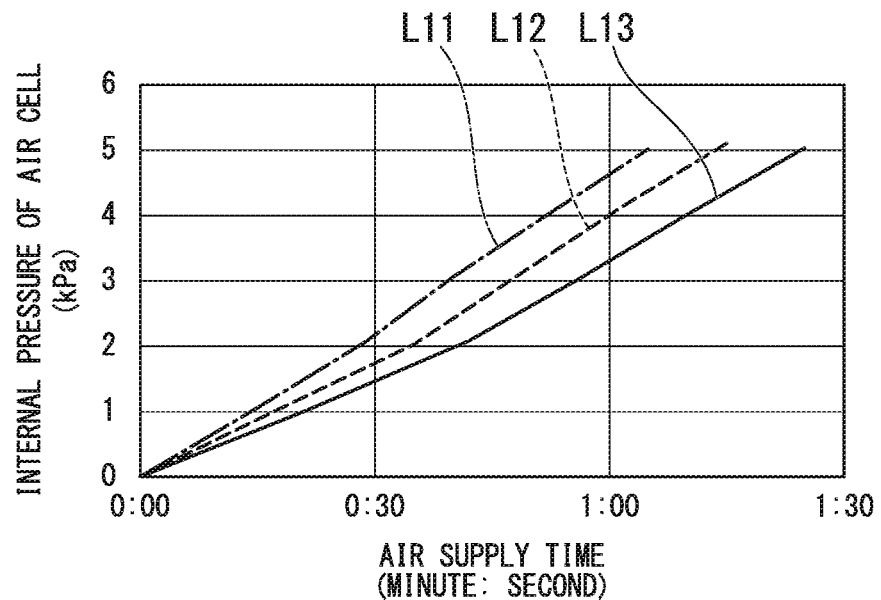
FIG. 11 is a graph showing a result of a third verification test for verifying an effect of an embodiment of the present invention, and is a graph showing a relationship between the internal pressure and the air supply time of the air cell for each load applied to the air cell.

FIG. 11 shows the result. In a graph in FIG. 11, the horizontal axis represents an air supply time (minute: second). All of the item name and the reference numerals indicating the graph lines which are shown in FIG. 11 are common to those of the graph in FIG. 9.

As shown in FIG. 11, it is confirmed that a long time is needed in increasing the internal pressure of the air cell 15 as the load applied to the air cell 15 is heavier.

In the fourth verification test, after a test environment which is the same as that of the second verification test is prepared, the internal pressure of the air cell is pressurized so as to measure a relationship between the internal pressure of the air cell and the time.

Figure 12:
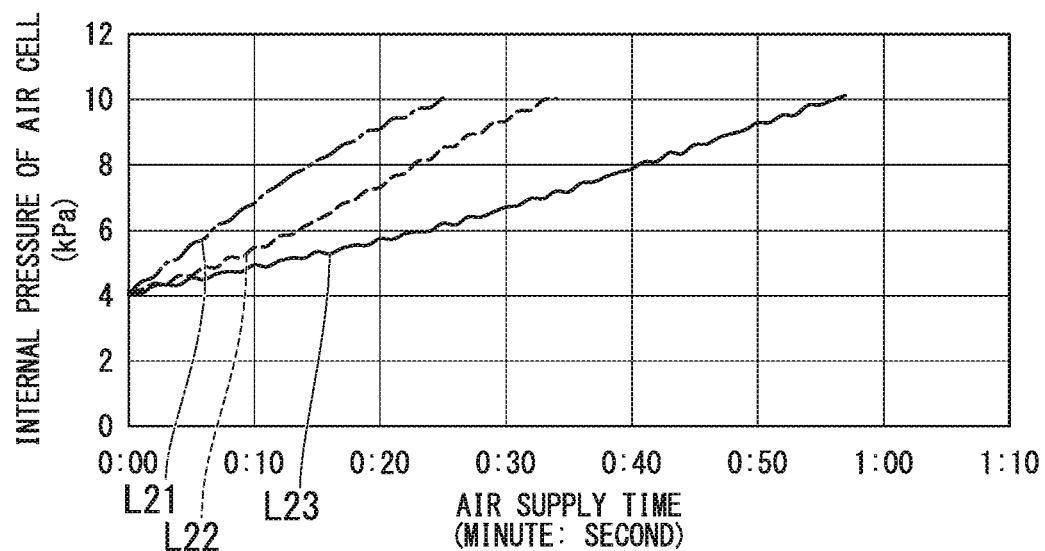
FIG. 12 is a graph showing a result of a fourth verification test for verifying an effect of an embodiment of the present invention, and is a graph showing a relationship between the internal pressure and the air supply time of the air cell for each load applied to the air cell.

FIG. 12 shows the result. In a graph in FIG. 12, the horizontal axis represents an air supply time (minute: second). All of the item name and the reference numerals indicating the graph lines which are shown in FIG. 12 are common to those of the graph in FIG. 10.

As shown in FIG. 12, it is confirmed that a long time is needed in increasing the internal pressure of the air cell as the load applied to the air cell is heavier.

In the fifth verification test, after a test environment which is the same as that of the first verification test is prepared, the internal pressure of the air cell 15 in the first group G1 (operation group) is decompressed from approximately 1.9 kPa (first internal pressure) to approximately 0.6 kPa (second internal pressure) so as to measure the internal pressure of the air cell 15 of the second group G2 and the third group G3 (maintenance group) at this time.

Table 1 shows the result.

TABLE 1

| | Load Applied to Mat Unit | | | | | |
|---|---|---|---|---|---|---|
| | 30 kg | | 59 kg | | 78 kg | |
| | Operation Group | Maintenance Group | Operation Group | Maintenance Group | Operation Group | Maintenance Group |
| Internal Pressure Before Air Exhaust (kPa) | 1.9 | 2.11 | 1.87 | 2.12 | 1.87 | 2.13 |
| Internal Pressure After Air Exhaust (kPa) | 0.62 | 2.18 | 0.63 | 2.37 | 0.62 | 2.51 |
| Internal Pressure change quantity (kPa) | −1.28 | 0.07 | −1.24 | 0.25 | −1.25 | 0.38 |

According to Table 1 above, it is confirmed that an internal pressure change of the maintenance group increases as the load applied to the air cell 15 increases.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10, 30, 40 AIR MAT DEVICE
11 MAT UNIT
12 AIR SUPPLY AND EXHAUST UNIT
13 INTERNAL PRESSURE MEASUREMENT UNIT
14 CONTROL UNIT
15 AIR CELL
P USER

What is claimed is:
1. An air mat device comprising:
   a mat unit including a plurality of air cells divided into multiple groups, wherein each air cell belongs to only one of the multiple groups, and wherein each air cell of adjacent air cells of the plurality of air cells belong to a different groups of the multiple groups;

an air supply and exhaust unit configured to supply air to an air cell of the plurality of air cells and exhaust the air from the air cell; and a control unit configured to control the air supply and exhaust unit according to a first weight of a user's body, the first weight being estimated by acquiring a control reference value when the air cell changes from a first state to a second state, wherein the air cell becomes the first state after at least part of a user's body contacts the air cell and the air cell changes from the first state to the second state, said control reference value determined by;

a time required for a state change, a state change quantity, or a state change quantity per unit time.

2. The air mat device according to claim 1, further comprising a detection unit which detects an internal pressure of the air cell, wherein:

the multiple groups include an operation group and a holding group;

the control unit controls the air supply and exhaust unit so as to, exhaust the air from at least one of the air cells of the operation group while stopping an exhausting of the air from at least one of the air cells of the holding group, and thereafter supplying the air to the exhausted air cells of the operation group; and the control unit acquiring, based on a detection result by the detection unit, as the control reference value, a change in an internal pressure of the air cells of the holding group while an internal pressure of the air cells of the operation group changes from a first internal pressure to a second internal pressure, in a state where the user applies the body weight on the mat unit.

3. The air mat device according to claim 2, wherein, when the air is supplied to and exhausted from each of the air cells, the control unit changes a combination between the operation group which performs air supply and exhaust and the holding group which does not perform air supply and exhaust, so as to obtain the control reference value multiple times, and controls the air supply and exhaust unit in accordance with the control reference values obtained multiple times.

4. The air mat device according to claim 1, further comprising a detection unit which detects a state of the air cell, wherein:

the detection unit detects, as the state of the air cell, at least one of an internal pressure of the air cell, a range of the air cell on which the at least partial body weight of the user is applied, a position of the air cell which relates to at least one of a shape and an inclined angle of the mat unit, a height of an upper surface of the air cell, a magnitude of the body weight applied to the air cell, and an air supply and exhaust quantity to and from the air cell; and the control unit acquires the control reference value, according to a detection result of the detection unit.

5. The air mat device according to claim 1, further comprising a detection unit which detects an internal pressure of the air cell as a state of the air cell, wherein:

the control reference value is the time required for the state change of the air cell;

the detection unit detects the internal pressure of the air cell is a first internal pressure, as the first state, and detects the internal pressure of the air cell at a second internal pressure as the second state; and in a state where the user lays the body weight of the user on the mat unit, while the control unit decompresses or pressurizes the air cell by causing the air supply and exhaust unit to exhaust the air or to supply the air, the control unit acquires, as the control reference value, a pressure changing time until the internal pressure of the air cell is changed from the first internal pressure to the second internal pressure, according to a detection result of the detection unit.

6. The air mat device according to claim 1, wherein:

when acquiring the control reference value, the control unit causes the air supply and exhaust unit to supply the air or to exhaust the air, and when the air is exhausted from each of the air cells, the control unit causes other groups to exhaust the air while remaining at least one of the multiple groups, and thereafter, supplies the air to the group which exhausted the air.

7. The air mat device according to claim 6, wherein, when the air is supplied to and exhausted from each of the air cells, the control unit changes a combination between an operation group which performs air supply and exhaust and a holding group which does not perform air supply and exhaust, so as to obtain the control reference value multiple times, and controls the air supply and exhaust unit in accordance with the control reference values obtained multiple times.

8. The air mat device according to claim 1, wherein each air cell in a particular group of the multiple groups is fluidly connected to all other air cells in that particular group.

9. An internal pressure control method for an air cell, comprising:

providing a mat unit that includes a plurality of air cells divided into multiple groups, wherein each air cell belongs to only one of the multiple groups, and wherein each air cell of adjacent air cells of the plurality of air cells belong to a different groups of the multiple groups;

supplying an air cell of the plurality of air cells with air and exhausting the air according to a first weight of a user's body, the first weight being estimated by acquiring control reference value;

acquiring one of the following as the control reference value when the air cell changes from a first state to a second state, a time required for a state change, a state change quantity, or a state change quantity per unit time; and setting the internal pressure of the air cell in the usage state, in accordance with the control reference value, wherein the air cell becomes the first state after at least part of a user's body contacts the air cell and the air cell changes from the first state to the second state.

10. The method according to claim 9, wherein each air cell in a particular group of the multiple groups is fluidly connected to all other air cells in that particular group.

* * * * *